Patented Jan. 12, 1937

2,067,234

UNITED STATES PATENT OFFICE 2,067,234

PIGMENTED GRANULAR POLYMERS

Wallace E. Gordon, Wilmington, and Winfield W. Heckert, Ardentown, Del., assignors, by mesne assignments, to E. I. du Pont de Nemours & Company, Wilmington, Del., a corporation of Delaware No Drawing. Application March 10, 1936, Serial No. 68,042

10 Claims. (Cl. 260—2)

This invention relates to the production of uniformly pigmented granular polymers of esters of acrylic and alpha-substituted acrylic acids and to articles made by molding said granular polymers and, more particularly, to a stabilizing agent for use in process of forming said uniformly pigmented granular polymers.

Heretofore, a process has been devised for polymerizing esters of acrylic and alpha-substituted acrylic acids to obtain a granular polymer, a form of polymer particularly adapted for the production of granular molding compounds subsequently to be molded under heat and pressure to form various articles.

A full disclosure of this process of granular polymerization is given in U. S. Patent application Serial No. 15,668, filed by Daniel E. Strain, April 10, 1935, entitled "Polymerization process". The so-called "granular" polymerization is carried out by introducing the monomeric ester, or a syrup of polymer dissolved in monomer, into a granulating bath, preferably a water bath, although other non-solvent mediums can be used, containing, as a dispersing agent, a water soluble polymerized derivative of acrylic or an alpha-substituted acrylic acid which is thermoplastic and adapted to give a proper dispersion of the compound to be polymerized in the non-solvent medium. The polymerization is carried out while the bath is vigorously agitated and preferably maintained at a temperature of about 70–80° C. It is preferred to buffer the granulating bath so as to maintain a pH of 5.5 to 8 by means of buffers such as sodium phosphate, borate, oxalate, tartrate, or the like.

The dispersing agent is preferably a homologue or derivative of the monomer being polymerized as, for example, in the polymerization of acrylic acid esters and homologues, the following dispersing agents would be suitable: polymeric acrylic acid, polymeric acrylamide, polymeric acrylic acid salts such as polymeric sodium acrylate, polymeric ammonium acrylate, and the like. For the polymerization of the esters of methacrylic acid such dispersing agents or granulating agents as the following would be suitable: polymethacrylamide, polymethacrylimide, polymeric methacrylic acid, acetate of polymerized diethyl amino ethyl methacrylate, volatile acid salts of the amino alcohol methacrylates such as are described in U. S. application Serial No. 21,807 filed by George D. Graves on May 16, 1935, polymeric methacrylic acid salts, e. g., polymeric sodium methacrylate, polymeric ammonium methacrylate, the polyalkyl ammonium methacrylates, e. g., mono- di- tri-, and tetramethylammonium methacrylates or acrylates.

Although the process for producing granular polymers described above gives a polymer highly suitable for molding, no practical method of uniformly incorporating insoluble coloring matter, i. e., ordinary pigments, pigment dyes, and the like, in the granular polymer, has heretofore been devised. While satisfactorily suitable dispersions of pigment can be obtained in a syrup of these polymeric esters dissolved in the monomeric esters, the pigments do not remain dispersed during polymerization of the ester to solid granular polymers but tend to collect at the surface of the polymer particles, that is, to flocculate during polymerization of the esters. When the granular polymer is molded, the flocculated pigment is therefore concentrated in spots, or layers, in the molded article instead of being uniformly dispersed, and a molded product inferior in appearance results.

An object of the present invention is to provide a method for producing these granular polymers in which the pigment is uniformly dispersed. A further object is to provide a stabilizing agent which will keep the pigment uniformly dispersed in the syrup of polymer dissolved in monomer during the polymerization in the granulating bath. Other objects of the invention will be apparent from the description given hereinafter.

The above objects are accomplished according to the present invention by the step of adding to the syrup of polymer dissolved in monomer, in which the pigment is dispersed, soya lecithin in a proportion great enough to stabilize the pigment during polymerization of the syrup in a granulating bath. More specifically, the present invention comprises the use of soya lecithin in a proportion of about three times by weight of the pigment employed although this amount may be greatly reduced in the case of particular pigments.

The present invention comprises the discovery that, by simply incorporating into the pigmented syrup of polymer dissolved in monomer a small amount of this soya lecithin, it acts to stabilize the dispersion of the pigment and prevent breaking up of the dispersion during the subsequent granular polymerization. This stabilizing agent, soya lecithin, thus prevents flocculation or concentration of the pigment at the surface of the granules of the polymer being formed and keeps the pigment uniformly dispersed throughout the polymer. As a result, articles molded from the granular polymers thus prepared are uniformly homogeneous and are greatly improved in appearance over articles prepared from granular polymers made without the use of this dispersion stabilizer.

The function of the soya lecithin is that of a stabilizing agent as compared to a dispersing agent and the present invention comprises the use of soya lecithin in stabilizing proportions and not merely in proportions such as a dispersing agent would ordinarily be used. Soya lecithin is a dispersing agent also and, in cases where a pigment is of such type as to make it advantageous to use a dispersing agent for dispersing it in the syrup of polymer dissolved in monomer, soya lecithin may be used but, unless the proportion of soya lecithin is sufficient for it also to stabilize the dispersion while the syrup is being converted to solid granular polymer, it is not present in stabilizing proportions.

In dispersing the pigment in the polymerizable composition, a syrup of polymer dissolved in monomer is used since the monomeric esters per se have too low a viscosity to serve for dispersing pigments. The syrup may be made by partially polymerizing monomer by heat, or the like, or, alternatively, dissolving about 5–10% of polymer, preferably a low viscosity type, in monomer. A solution comprising 7.5% polymer and 92.5% monomer forms a syrup of convenient viscosity.

The desired amount of pigment is added to the syrup of polymer and monomer and the mixture is ground in a ball mill, or the like, generally for 24–48 hours. In the case of most pigments, stable dispersions of pigment in syrup are thus obtained which will stand for months without settling or breaking and which can be diluted with additional quantities of monomer without causing the dispersion to break. In the case of a few pigments such as carbon black or titanium dioxide, which do not form stable dispersions very readily, it is preferred to add a small amount of dispersing agent, which may be soya lecithin, to the mixture before grinding. In this way stable dispersions can thus be obtained.

As a matter of commercial practice, it will be convenient to make the dispersion containing a higher proportion of pigment than desired in the pigmented polymer, or in the final molded article, so that simple dilution of this so-called "mill base" with fresh monomer will give the desired mixture for polymerization.

To the mill base thus prepared, fresh monomeric ester is added containing in solution or dispersion the desired amount of soya lecithin and also the desired amount of polymerization catalyst, if a catalyst is to be used. The mixture may then be diluted with pure monomeric ester until the required concentration of pigment is obtained. The dispersion of pigment in syrup containing the soya lecithin in stabilizing proportions and a polymerization catalyst, if one is desired, is then added with vigorous stirring to a granulating bath which preferably comprises a relatively large quantity of water kept at a temperature of 70–80° C. and containing a suitable granulating agent and a buffer. After addition of the syrup to the granulating bath the temperature of the bath is maintained until refluxing ceases, which generally requires about 45 minutes. The mixture is then preferably heated 5–10 minutes longer in order to insure complete polymerization and is then cooled. The solid granular polymer may then be filtered, washed, and dried to put it in condition for molding.

The minimum proportion of soya lecithin to stabilize the dispersion of pigment during polymerization varies greatly with different pigments. To be on the safe side, three times as much soya lecithin as pigment, by weight, should be used, although particular pigments require far less soya lecithin to fully stabilize them. For example, a stable polymer can be prepared from a methyl methacrylate syrup containing 1% of titanium dioxide and only 0.15% of soya lecithin, both percentages being based upon the weight of the syrup. On the other hand, in a similar syrup containing 0.02% of Milori blue it would be preferred to employ 0.06% of soya lecithin.

Illustrations of stable mill bases used in the specific examples given hereinafter are as follows:

*Base A*

| | Grams |
|---|---|
| Milori blue | 25 |
| Syrup | 225 |

*Base B*

| | Grams |
|---|---|
| Zinc oxide | 25 |
| Syrup | 225 |

*Base C*

| | Grams |
|---|---|
| Cadmium red | 25 |
| Syrup | 225 |

*Base D*

| | Grams |
|---|---|
| Carbon black | 25 |
| Syrup | 225 |
| Soya lecithin (5% of the weight of the pigment as a dispersing agent) | 1.25 |

In each of the above mill bases the syrup was composed of 7.5% of polymeric methyl methacrylate and 92.5% of monomeric methyl methacrylate and excellent stable dispersions of the pigments in this syrup were obtained by grinding in ball mills for 24–48 hours. Obviously, mill bases of the above concentrations are not necessary as the concentration of pigments in such bases can be varied as convenient.

In order to illustrate the present invention, the following specific examples are given using the mill bases disclosed above:—

*Example 1.*—In a one liter, three neck flask equipped with a thermometer, reflux condenser, and anchor-type glass stirrer, was placed a solution of 1.18 grams of $Na_2HPO_4.12H_2O$, 0.06 gram $NaH_2PO_4.H_2O$, and 1.2 grams of polymethacrylamide, (the function of which is to serve as a granulating agent to promote polymerization of the methyl methacrylate in granular form) in 240 cc. of distilled water. The pH of the mixture was 7.8 and it was heated to 70° C. with vigorous stirring.

To this granulating bath was added with vigorous stirring 60 grams of a mixture of the following composition:

| | Grams |
|---|---|
| Mill base "B" | 1.5 |
| Benzoyl peroxide | 0.6 |
| Soya lecithin (300% based upon the weight of the pigment) | 0.45 |
| Monomeric methyl methacrylate | 57.45 |

The temperature of the bath was then heated to

80° C. and maintained until refluxing ceased. The temperature of the reaction mixture rose to about 90° C. when refluxing ceased, and the heating was continued for 10 minutes longer whereupon the mixture was cooled to about 60° C., filtered, and the granular polymer was washed several times with hot water and dried over night at 80° C. in air.

An 89% yield of polymer was obtained. The polymer, when molded into a circular disc, showed excellent dispersion of pigment, being free of blemishes or mottled appearance.

*Example 2.*—To a granulating bath prepared as described in Example 1 was added with vigorous stirring 60 grams of a mixture of the following composition:

| | Grams |
|---|---|
| Mill base "A" | 0.12 |
| Benzoyl peroxide | 0.6 |
| Soya lecithin (250% based upon the weight of the pigment) | 0.03 |
| Monomeric methyl methacrylate | 59.25 |

The mixture was polymerized and the granular polymer isolated as described in Example 1. An 89% yield of polymer was obtained. The molded disc of the polymer was colored a clear transparent blue with no visible defects or mottled appearance.

*Example 3.*—Example 1 was repeated except that 0.6 gram of methyl starch was used as a granulating agent in place of the polymethacrylamide in the granulating bath, and that 60 grams of a mixture of the following composition was polymerized instead of the mixture described in Example 1:

| | Grams |
|---|---|
| Mill base "C" | 3. |
| Benzoyl peroxide | 0.6 |
| Soya lecithin (250% based upon the weight of pigment) | 0.75 |
| Monomeric methyl methacrylate | 55.65 |

An 85% yield of polymer was obtained. This polymer molded to a beautiful red, opaque disc, free of mottled appearance or other visible defects.

*Example 4.*—In the preparation of this polymer, the process of Example 1 was followed throughout except that 1.5 grams of polymethacrylamide was used in the granulating bath instead of 1.2 grams as in Example 1, and that there was added to the granulating bath 60 grams of a mixture of the following composition:

| | Grams |
|---|---|
| Mill base "D" | 3.0 |
| Benzoyl peroxide | 1.2 |
| Soya lecithin (300% of the weight of the pigment) | 0.9 |
| Monomeric methyl methacrylate | 54.9 |

An 84% yield of polymer was obtained. A disc molded from this polymer showed excellent pigment dispersion and was opaque and black.

The following two examples illustrate the use of a dye in combination with pigments in the preparation of polymers according to this invention:

*Example 5.*—Example 1 was repeated except that 0.12 gram of a yellow Celanthrene dye was dissolved in the monomeric methyl methacrylate in the polymerization mixture before it was added to the granulating bath, and that 1.05 grams (instead of 1.2 grams) of polymethacrylamide was used in the granulating bath. A disc molded from the resulting polymer was colored uniformly translucent yellow and was free of visible defects.

*Example 6.*—Example 2 was repeated except that 60 grams of a mixture of the following composition was polymerized in place of the mixture given in Example 2:

| | Grams |
|---|---|
| Mill base "A" | 0.06 |
| Benzoyl peroxide | 0.6 |
| Soya lecithin (400% based upon the weight of pigment in the polymerizable mixture) | 0.024 |
| Monomeric methyl methacrylate | 59.32 | in which was dissolved 0.6 gram of Celanthrene yellow dye.

An 88% yield of polymer was obtained. A clear transparent green disc was molded from this polymer.

The following example illustrates the use of mixed pigments according to this invention:

*Example 7.*—Example 1 was repeated except that 1.35 grams (instead of 1.2 grams) of polymethacrylamide was used and that the following mixture was substituted for the mixture used therein:

| | Grams |
|---|---|
| Mill base "B" | 1.5 |
| Mill base "A" | 0.18 |
| Soya lecithin | 0.504 |
| Benzoyl peroxide | 0.6 |
| Monomeric methyl methacrylate | 57.22 |

An 87% yield of polymer was obtained. A disc molded from this polymer was a clear, translucent blue in color and was free of visible defects.

The above examples are merely illustrative of the present invention which broadly comprises the use of lecithin as a stabilizing agent for the pigment dispersion in the syrups of the type herein described during granular polymerization.

Polymerizable esters coming within the scope of the present invention comprise the esters of acrylic and alpha-substituted acrylic acids. The majority of these esters may be represented by the formula $CH_2=C(R_1)-COOR_2$, wherein $R_1$ is hydrogen in the case of the acrylic acid esters or, in the case of the alpha-substituted acrylic acid esters, a monovalent hydrocarbon radical as an alkyl radical, e. g., methyl, ethyl, propyl, cyclohexyl, or an aryl radical, e. g., phenyl, or an aralkyl radical, e. g. benzyl. $R_2$ is a monovalent hydrocarbon radical as an alkyl, aryl, or aralkyl radical, e. g., methyl, ethyl, propyl, butyl, isobutyl, cyclohexyl, phenyl, lauryl, benzyl and naphthyl.

In the above formula only mono-acrylates and alpha-substituted acrylates are included. Since the present invention requires the formation of a viscous syrup in which to properly disperse the pigments, and such syrup is obtained by dissolving polymer in monomer, the use of a polymer insoluble in monomer is precluded. The polymers of the compounds included in the above formula are all mono-esters and soluble in monomer, hence adapted for use in the present invention. The polymers of di- and poly-acrylates and alpha-substituted acrylates are, in general, insoluble in monomer and hence cannot be used as a polymer to be dissolved in monomer to form the syrup. However, these compounds can be used as the monomer ingredient of the syrup in combination with a polymer of a mono-ester soluble in monomer. For example, glycol dimethacrylate polymer is insoluble in the monomers of these compounds but a syrup may be made by dissolving 5-10% of polymeric methyl methacrylate in 95–90% of monomeric glycol di-methacrylate and the process carried out advantageously.

The monomer and polymer ingredients of the syrup may be the same or different compounds, in the latter case a mixed granular polymer resulting. Likewise, the monomer ingredient may comprise two or more of these compounds, thus giving a granular interpolymer. Also, other polymerizable compounds may be added to vary the properties of the resulting polymer, as, for example, vinyl compounds, e. g., vinyl chloride, alcohol, acetate, and chloro-acetate; acids of the acrylic series such as acrylic and methacrylic acids, and their nitriles and amides; itaconic and fumaric acids and their esters, amides, nitriles, and the like; vinyl and substituted vinyl ketones such as methyl vinyl ketone and methyl isopropenyl ketone; methacrylyl urea, butadiene, chlorobutadiene, isoprene, and the like.

Various modifiers as plasticizers, soluble dyes, waxes, mold lubricants as ethyl palmitate, butyl stearate, stearic acid, and the like, may be added to the syrup prior to polymerization to develop various desired properties. The use of these various modifiers is well known to those skilled in the art.

Any pigments or other type of insoluble coloring matter can be used in this invention provided they can be satisfactorily dispersed in the mill base and do not flocculate on dilution thereof or on heating the mixture. In addition to the pigments disclosed in the examples, pigments particularly adapted for use in the present invention include antimony oxide, $MgTiO_3$, Parowax, Asiatic wax, "Rose Toner", litharge, lithopone, barium stearate, chalk, talc, Chinese blue, or mixtures thereof with other pigments, lakes, and the like.

While the specific examples illustrate the use of soya lecithin, the invention is, of course, only limited to soya lecithin because of its commercial availability. Soya lecithin is composed chiefly of the chemical compound, lecithin, and either the pure compound obtained by refinement of vegetable lecithins and egg lecithin, or made synthetically, can be used. In fact, the use of lecithins derived from all sources, even though not chemically pure, are suitable in the invention provided no adulterants or diluents of a deleterious nature are present. Since soya lecithin is the only lecithin commonly available on the market today and the art is familiar with it, the term soya lecithin is used throughout, but pure lecithin and other vegetable lecithins as discussed above, are obvious equivalents. Ordinary lecithin is regarded as an ester-like derivative of choline and glycerophosphoric acid which is combined with stearic and palmitic acids to form a glyceride probably having the structure:

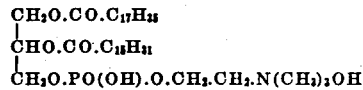

Corresponding distearo- and dioleo- compounds are known and may be used in this invention. Also, the so-called beta-lecithins, where the phosphoric acid is attached to the beta-hydroxyl group of the glycerol, and hydro-lecithin (hydrogenated lecithin) may be used, as well as the closely related cephalins.

The use of a polymerization catalyst in the granular polymerization is generally advantageous and benzoyl peroxide is the preferred catalyst, although other organic peroxides and hydrogen peroxide may be used.

The use of the present invention is primarily in connection with the granular polymerization of the acrylic acid and alpha-substituted acrylic acid esters. While in the emulsion polymerization of these esters and the casting process of polymerization there is little tendency for the dispersion of pigment to be broken during polymerization, nevertheless soya lecithin may be used in these types of polymerization also to insure stabilization of the pigment while the composition is being polymerized. The chief use of the granular polymers is in the preparation of molding powders to be subsequently molded into articles under heat and pressure.

An advantage of the present invention is that it makes it possible to prepare granular pigmented polymers having the pigment uniformly dispersed throughout and, consequently, to prepare molded articles from such polymers having a uniform and much improved appearance over molded articles heretofore prepared from granular pigmented polymers of this class of esters. Without the present invention the granular process for polymerizing pigmented acrylic and alpha-substituted acrylic acid esters would be of little value because of the poor appearance of articles molded from such polymers. Furthermore, the present invention not only makes the preparation of uniformly pigmented polymers possible but it provided an extremely simple method of doing same involving, with respect to the granular polymerization process, the single step of adding lecithin to the pigmented syrup prior to polymerization. It will be understood that the present invention does not reside in the granular polymerization process per se but in the discovery of the surprising and advantageous property of relatively small amounts of lecithin to stabilize pigment dispersions during polymerization in the granular polymerization process, or in other polymerization processes wherein there is a tendency for the pigment dispersion to break during polymerization.

As many apparently widely different embodiments of this invention may be made without departing from the spirit and scope thereof, it is to be understood that the invention is not limited to the specific embodiments thereof except as defined in the appended claims.

We claim:

1. In the manufacture of uniformly pigmented granular polymerization products of acrylic and alpha-substituted acrylic acid esters by dispersing pigment in a syrup of polymer dissolved in monomer and polymerizing said syrup in a granulating bath, the step comprising adding to said syrup soya lecithin in proportions great enough to stabilize said pigment dispersion during polymerization.

2. In the manufacture of uniformly pigmented granular polymerization products of acrylic and alpha-substituted acrylic acid esters by dispersing pigment in a syrup of polymer dissolved in monomer and polymerizing said syrup in a granulating bath, the step comprising adding to said syrup soya lecithin in an amount equal to about three times the weight of pigment contained therein.

3. In the manufacture of uniformly pigmented granular polymerized methyl methacrylate by dispersing pigment in a syrup of polymerized methyl methacrylate dissolved in monomeric methyl methacrylate and polymerizing said syrup in a granulating bath, the step comprising adding to said syrup soya lecithin in a proportion great enough to stabilize said pigment dispersion during the polymerization.

4. In the manufacture of uniformly pigmented granular polymerized methyl methacrylate by dispersing pigment in a syrup of polymerized methyl methacrylate dissolved in monomeric methyl methacrylate and polymerizing said syrup in a granulating bath, the step comprising adding to said syrup soya lecithin in an amount equal to about three times the weight of pigment contained therein.

5. A stabilized pigment composition comprising a pigment dispersed in a syrup of a polymeric ester dissolved in a monomeric ester, said esters being selected from the group consisting of the acrylic and alpha-substituted acrylic acid esters, and containing, as a stabilizing agent, soya lecithin.

6. A stabilized pigment composition comprising a pigment dispersed in a syrup of a polymeric ester dissolved in a monomeric ester, said esters being selected from the group consisting of the acrylic and alpha-substituted acrylic acid esters, and containing, as a stabilizing agent, soya lecithin in an amount equal to about three times the pigment contained therein.

7. A stabilized pigment composition comprising a pigment dispersed in a syrup of polymeric methyl methacrylate dissolved in monomeric methacrylate, and containing, as a stabilizing agent, soya lecithin.

8. A stabilized pigment composition comprising a pigment dispersed in a syrup of polymeric methyl methacrylate dissolved in monomeric methyl methacrylate, and containing, as a stabilizing agent, soya lecithin in an amount equal to about three times the pigment contained therein.

9. Composition comprising a granular polymeric ester selected from the group consisting of the acrylic and alpha-substituted acrylic acid esters, a pigment and soya lecithin in an amount equal to about three times the pigment contained therein, said pigment being uniformly distributed through said granular polymeric ester.

10. Composition comprising granular polymeric methyl methacrylate, a pigment, and soya lecithin in an amount equal to about three times the pigment contained therein, said pigment being uniformly distributed through said granular polymeric methyl methacrylate.

WALLACE E. GORDON.
WINFIELD W. HECKERT.